(12) United States Patent
Laning

(10) Patent No.: US 6,318,490 B1
(45) Date of Patent: *Nov. 20, 2001

(54) MOTORCYCLE CRUISE CONTROL

(75) Inventor: Philip J. Laning, Pewaukee, WI (US)

(73) Assignee: G-Zero Technologies, LLC, Cedarburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/687,537

(22) Filed: Oct. 13, 2000

Related U.S. Application Data

(63) Continuation of application No. 09/175,980, filed on Oct. 20, 1998.
(60) Provisional application No. 60/062,642, filed on Oct. 22, 1997.

(51) Int. Cl.⁷ .................................................. B60K 31/00
(52) U.S. Cl. .............................. 180/170; 74/488; 123/349
(58) Field of Search .............................. 180/170; 74/488; 123/349

(56) References Cited

U.S. PATENT DOCUMENTS

| | | |
|---|---|---|
| D. 267,085 | 11/1982 | Kiser, Jr. . |
| D. 273,101 | 3/1984 | Kiser, Jr. . |
| 3,982,446 | 9/1976 | VanDyken . |
| 4,137,793 | 2/1979 | Sowell . |
| 4,256,197 | 3/1981 | Kiser, Jr. . |
| 4,286,699 | 9/1981 | Pawelka . |
| 4,286,700 | 9/1981 | Morris et al. . |
| 4,336,858 | 6/1982 | Loyzim . |
| 4,352,303 | 10/1982 | Christner . |
| 4,569,239 | 2/1986 | Shirley et al. . |
| 4,580,537 | 4/1986 | Uchiyama . |
| 4,587,937 | 5/1986 | Masuda . |
| 4,630,703 | 12/1986 | Fletcher . |
| 4,746,826 * | 5/1988 | Burney ................................... 310/78 |
| 4,875,386 | 10/1989 | Dickerson . |
| 4,898,137 | 2/1990 | Fujita et al. . |
| 4,932,375 * | 6/1990 | Burney ................................... 123/361 |
| 4,966,247 | 10/1990 | Masuda . |
| 4,969,531 | 11/1990 | Hirakata et al. . |
| 6,135,227 * | 10/2000 | Laning ................................... 180/170 |

* cited by examiner

Primary Examiner—Paul N. Dickson
(74) Attorney, Agent, or Firm—Foley & Lardner

(57) ABSTRACT

A cruise control for a vehicle having a throttle controller mounted to a handlebar is provided. The cruise control includes a throttle-pipe handle having a throttle-pipe spur gear attached thereto, a cruise control spur gear coupled to the throttle-pipe spur gear, an electromagnetic brake/clutch device coupled to the cruise control spur gear, an activation switch, and a control circuit. The cruise control spur gear may be coupled to the throttle-pipe spur gear via an intermediate spur gear. The control circuit provides a control signal to activate the electromagnetic brake/clutch device when the activation switch is actuated. When activated, the electromagnetic brake/clutch device prevents rotation of the throttle-pipe handle. When the braking system of the motorcycle is activated, the control signal provided to the electromagnetic brake/clutch device is removed, which deactivates the brake/clutch device, allowing free rotation of the throttle-pipe handle.

15 Claims, 6 Drawing Sheets

MOTORCYCLE CRUISE CONTROL

This application is a continuation of application Ser. No. 09/175,980, filed Oct. 20, 1998.

This application claims the benefit of U.S. Provisional Application No. 60/062,642, filed Oct. 22, 1997.

FIELD OF THE INVENTION

The present invention relates generally to motorcycles and other vehicles wherein the speed of the vehicle's engine is controlled by a rotatable throttle controller attached to a handlebar of the vehicle, and more particularly to cruise control methods and devices for locking the handle bar mounted throttle controller in position and automatically releasing the throttle controller from the locked position upon activation of the vehicle's braking system.

BACKGROUND OF THE INVENTION

In numerous vehicles, such as motorcycles, which have handlebars for steering, the speed of the vehicle's engine is controlled by a rotatable throttle-pipe handle mounted on an end of one of the handlebars. The rotatable throttle-pipe handle is mechanically coupled via, e.g., one or more throttle cables, to the throttle linkage of the vehicle's carburetor. Thus, by rotating the throttle-pipe handle, the engine speed and, therefore, the speed of the vehicle, may be controlled.

For safety purposes, the throttle-controller is typically resiliently biased, e.g., using a return spring, to return the throttle-pipe handle to an engine idle position when an operator's grasp on the throttle-pipe handle is released. Thus, to maintain a constant speed, an operator of the vehicle must hold the throttle-pipe handle firmly at a desired rotational position. On a long motorcycle trip, for example, this can become very fatiguing. Holding the throttle-pipe handle in a desired position for a long duration can be dangerous if the prolonged exertion required to maintain the throttle-pipe handle in a desired position causes the operator's hand and/or arm to fall asleep. Avid motorcyclists may experience medical problems, such as Carpal Tunnel Syndrome, which may be caused by the repeated and prolonged stress, lack of circulation, numbness, and fatigue to the hand which results from extended periods with the hand tightly grasped around the throttle-pipe handle to maintain the handle in a desired position.

Numerous devices and methods have been developed with the intended purpose of allowing a motorcycle operator to establish a desired motorcycle cruising speed without requiring a constant forceful turning of the throttle-pipe handle. Such devices may be referred to generally as motorcycle cruise control devices. Some of the most simple motorcycle cruise control devices employ springs which bias the throttle-pipe handle toward the "on" position, to thereby counteract, or partially counteract, the bias of the return spring, which attempts to return the throttle pipe handle to the idle position. Such devices attempt either to reduce the amount of effort required to advance the throttle-pipe handle, or to balance the rotational forces applied to the throttle-pipe handle so that the throttle-pipe handle will stay in a given position. If such a device simply reduces the amount of effort required to advance the throttle pipe handle, it is only a partial solution, since the throttle-pipe handle must still be grasped, turned, and held in position continuously to maintain a desired engine speed. If the device is designed to balance the forces applied to the throttle-pipe handle, the throttle-pipe handle will not automatically return to the idle position when the handle is released. Such a device requires that the throttle pipe handle be returned manually to the idle position. In a rapidly developing emergency situation, failure to return the throttle pipe handle to the idle position rapidly and automatically can be hazardous.

Other known cruise control devices employ a split-ring retainer mounted around the outer circumference of the throttle-pipe handle and fixed to the handle bar. A manually actuated cam lever is provided on the split-ring to clamp the ring around the throttle pipe handle, to prevent rotation thereof, when the throttle-pipe handle has been rotated to a desired position. By thus locking the throttle-pipe handle into a desired position on the handlebar, a desired engine speed can be maintained. The split-ring retainer is released manually, via manual actuation of the cam lever, to allow free rotation of the throttle-pipe handle. Thus, in an emergency situation, the cam lever must be manually actuated to allow the throttle-pipe handle to return automatically to the idle position by operation of the return spring. The requirement for manual release of such cruise control devices can be hazardous in a rapidly developing emergency situation. Examples of cruise control devices employing split-ring retainers are illustrated and described in U.S. Pat. Nos. 3,982,446, 4,137,793, 4,256,197, U.S. Pat. No. Des. 267,085 and U.S. Pat. No. Des. 273,101.

A more advanced system for maintaining a motorcycle throttle-pipe handle in a desired cruising position is described in U.S. Pat. No. 4,286,700. This patent describes a mechanically actuated locking arm mounted to the rotatable throttle-pipe handle and a cog fixedly mounted to the motorcycle handlebar. The locking arm may be mechanically actuated to engage the cog to prevent throttle rotation when the throttle-pipe handle is turned to a desired position. The locking arm may be disengaged from the cog either manually or automatically when the motorcycle's brakes are engaged. Automatic release of the locking arm from the cog is achieved using a solenoid actuator electrically connected for operation with the motorcycle brake system or brake lights. Although this system does provide for automatic release of the throttle-pipe handle to the idle position in an emergency situation, when the motorcycle brake is actuated, the system is complex, bulky, and has several other drawbacks. For example, the throttle-pipe handle may only be fixed in one of a discreet and limited number of positions defined by the cog teeth. Thus, such a system does not allow fixing of the throttle-pipe handle in any desired position. Furthermore, once the locking arm is engaged with the cog, the cruise control system must be disengaged, to remove the locking arm from the cog, in order for the cruising speed to be adjusted (either slowed down or sped up). Thus, such a system does not allow adjustment of the motorcycle cruising speed without disengaging and then re-engaging the cruise control mechanism.

Much more advanced and complicated motorcycle cruise control systems have also been developed. Such systems may typically employ, for example, microprocessor controlled systems for controlling the vehicle's engine speed to maintain a desired vehicle speed. Such systems are comparable in complexity to cruise control systems employed in automobiles, for example. Although such systems are effective, they are relatively very complex and expensive, and are therefore only suitable for the largest and most expensive motorcycles. Examples of such complicated cruise control systems are described in U.S. Pat. Nos. 4,580,537, 4,587,937, 4,966,247 and 4,969,531.

SUMMARY OF THE INVENTION

The present invention provides a cruise control for a motorcycle or other vehicle which fixes a rotatable throttle-pipe handle in any desired position during cruising and which automatically releases the throttle-pipe handle from the fixed position when the vehicle's brakes are applied. A motorcycle cruise control in accordance with the present invention includes a throttle-pipe handle mechanically coupled via spur gears to an electromagnetic brake/clutch. The electromagnetic brake/clutch is electrically connected to a cruise control activation switch and the motorcycle braking system, e.g., the brake light system. To set the motorcycle engine speed at a desired level the throttle-pipe handle is rotated to a desired position and the cruise control activation switch is activated to thereby activate the electromagnetic brake/clutch which prevents rotation of the spur gears and, therefore, the throttle-pipe handle. When the brake system of the motorcycle is operated, via either a hand brake lever or a foot brake pedal, the electromagnetic brake/clutch is deactivated, thereby allowing free rotation of the spur gears and the throttle-pipe handle, and automatic return of the throttle back to the idle position by operation of the throttle return spring.

A motorcycle cruise control in accordance with the present invention includes a throttle-pipe handle rotatably mounted at the end of the handlebar of a motorcycle or other vehicle. The rotatable throttle pipe handle is mechanically coupled, in a conventional manner, to the throttle linkage of the motorcycle's carburetor such that the motorcycle's engine speed is adjusted by rotation of the throttle pipe handle. The throttle is equipped with a return spring which biases the throttle pipe handle toward the closed position, such that when the throttle-pipe handle is released the throttle-pipe handle will automatically return to an idling position by action of the return spring.

In accordance with the present invention, the throttle-pipe handle has a throttle pipe spur gear attached around the circumference thereof at or near an end of the throttle-pipe handle opposite the end of the handlebar. The throttle-pipe handle is mounted on the motorcycle handlebar such that the throttle-pipe spur gear is positioned within a gear box housing. A cruise control spur gear is also mounted in the gear box housing and is coupled to the throttle pipe spur gear such that rotation of the throttle-pipe handle causes rotation of the throttle pipe and cruise control spur gears. An intermediate spur gear may be mounted in the gear box housing to couple the throttle pipe spur gear to the cruise control spur gear. Preferably, the diameter of the throttle pipe spur gear is larger than the diameter of the intermediate spur gear, which, in turn, is larger than the diameter of the cruise control spur gear.

The cruise control spur gear is mechanically coupled, e.g., via a cruise control shaft, to an electromagnetic brake/clutch mounted in a brake/clutch housing. The electromagnetic brake/clutch may be implemented in a conventional manner. When an electrical control signal is provided to the electromagnetic brake/clutch, rotation of the cruise control shaft coupled thereto and, in turn, rotation of the cruise control spur gear, is prevented. Thus, when the electromagnetic brake/clutch is activated, rotation of the throttle-pipe handle is also prevented. Preferably, the force applied by the electromagnetic brake/clutch through the shaft and the spur gears to the throttle-pipe handle is sufficient to prevent rotation of the throttle-pipe handle against the force applied thereto by the throttle return spring as well as vibrational forces encountered during motorcycle operation, to thereby maintain a constant engine speed when the cruise control is activated. However, the force applied to the throttle-pipe handle by the electromagnetic brake/clutch preferably does not prevent a motorcycle operator from manually adjusting the rotational position of the throttle-pipe handle and, therefore, the motorcycle engine speed, when the cruise control is activated.

The electromagnetic brake/clutch is preferably operated by a control circuit which includes a cruise control activation switch connected in parallel with a normally open relay and in series with a normally closed relay. When the cruise control activation switch is activated, the normally open relay is closed to provide a control signal from the motorcycle power supply through the now closed normally open relay to the electromagnetic brake/clutch to thereby activate the brake/clutch to hold the throttle-pipe handle in a desired position. The normally closed relay is electrically coupled to the motorcycle braking system, e.g., to the brake light system. When the motorcycle braking system is operated, by either a hand lever or foot pedal, a signal is provided to operate the motorcycle brake light. Simultaneously, the normally closed relay is opened, to thereby remove the control signal provided to the electromagnetic brake/clutch to, in turn, allow free rotation of the throttle-pipe handle. Automatic deactivation of the electromagnetic brake/clutch in response to braking system operation allows the throttle return spring to automatically return the throttle-pipe handle to the idle position in an emergency situation. The electromagnetic brake/clutch remains deactivated until the cruise control activation switch is activated again.

A motorcycle cruise control in accordance with the present invention allows a motorcycle operator to maintain a desired motorcycle engine cruising speed without continuously grasping and turning the throttle-pipe handle. Thus, operator fatigue is reduced. A motorcycle cruise control in accordance with the present invention also features automatic release of the throttle-pipe handle from a set position when the motorcycle braking system is activated, thereby providing for automatic return of the throttle to an idle position, without further operator intervention, in an emergency situation. A motorcycle cruise control in accordance with the present invention preferably also allows manual rotation of the throttle-pipe handle when the cruise control system is activated, thereby allowing the engine cruising speed to be adjusted during cruise control operation without requiring deactivation and reactivation of the cruise control. All of these features may be implemented in accordance with the present invention in a relatively inexpensive non-complicated cruise control device which may be ergonomically designed and easily installed on a motorcycle handlebar. A motorcycle cruise control in accordance with the present invention may be factory installed or installed for the modification and enhancement of an existing motorcycle. It should be noted that a motorcycle cruise control in accordance with the present invention is not limited in application to just motorcycles, but may be applied to any vehicle of the type having handlebars with a rotatable throttle control attached thereto such as, for example, four-wheeled all terrain vehicles.

Further objects, features and advantages of the present invention will be apparent from the following detailed description taken in conjunction with the accompanying drawings.

DETAILED DESCRIPTION OF THE INVENTION

Figure 1:
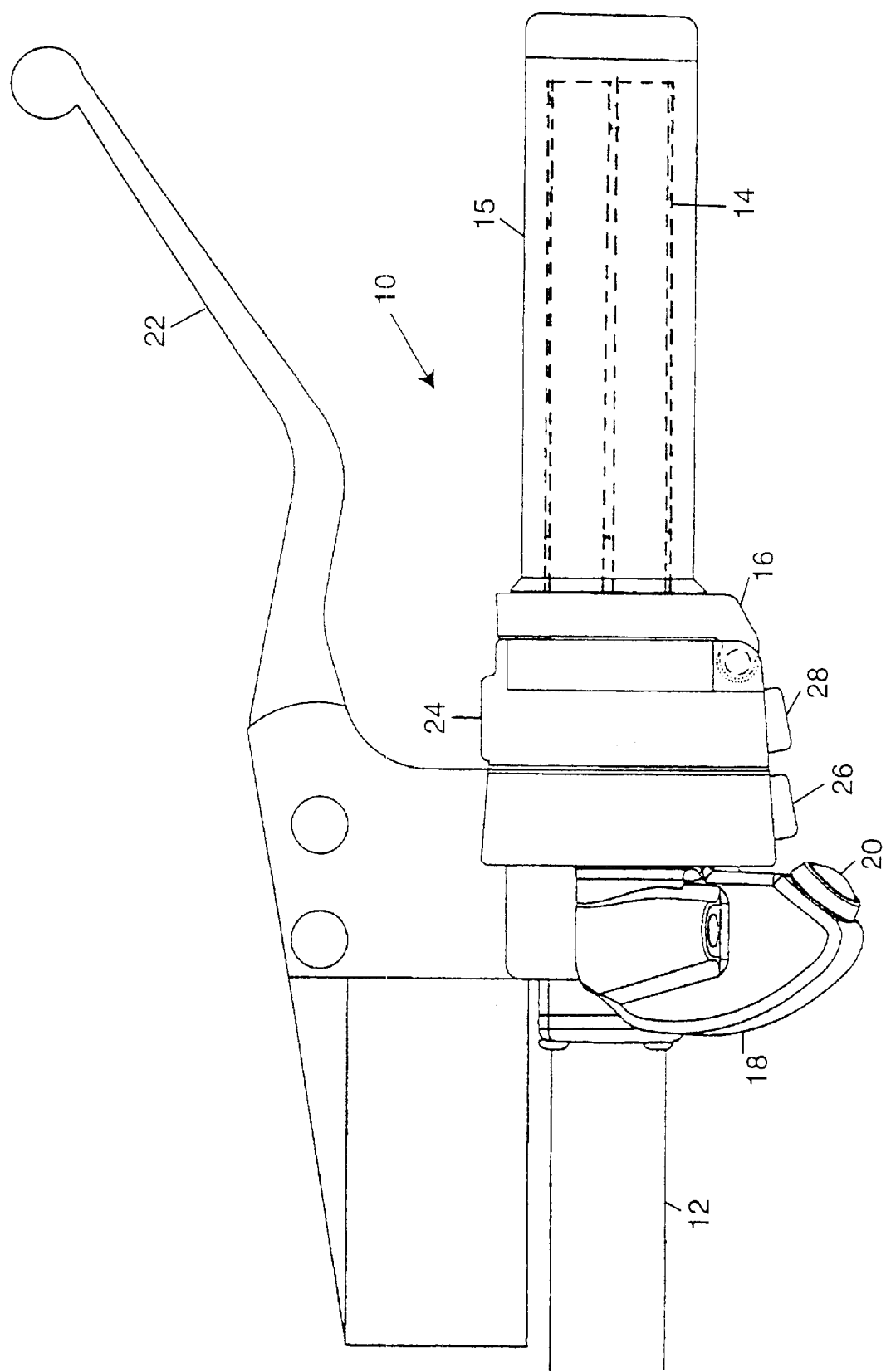
FIG. 1 is a top view of an exemplary motorcycle cruise control in accordance with the present invention as attached to the handlebar of a motorcycle.
Figure 2:
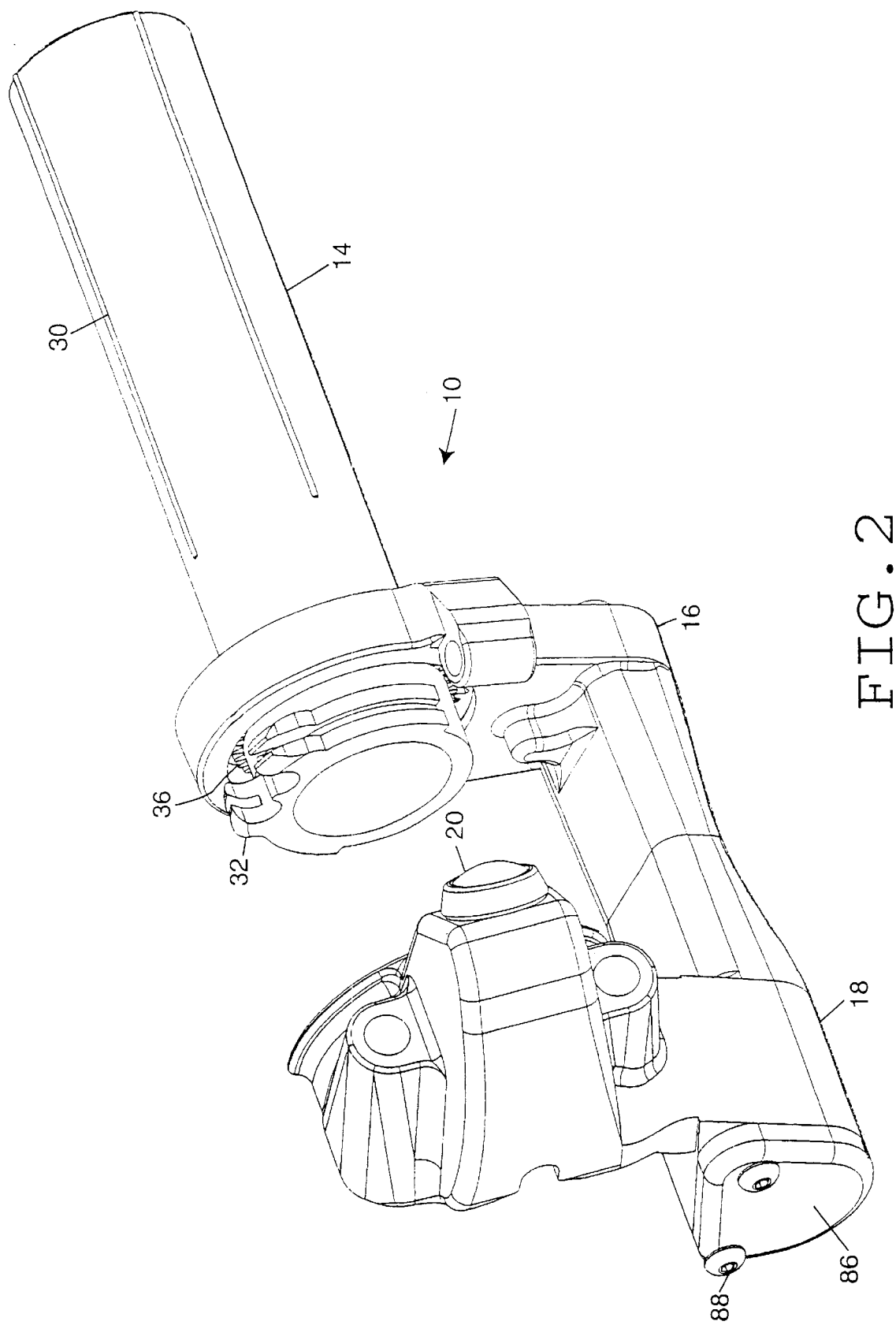
FIG. 2 is a front perspective view of an exemplary motorcycle cruise control in accordance with the present invention.
Figure 3:
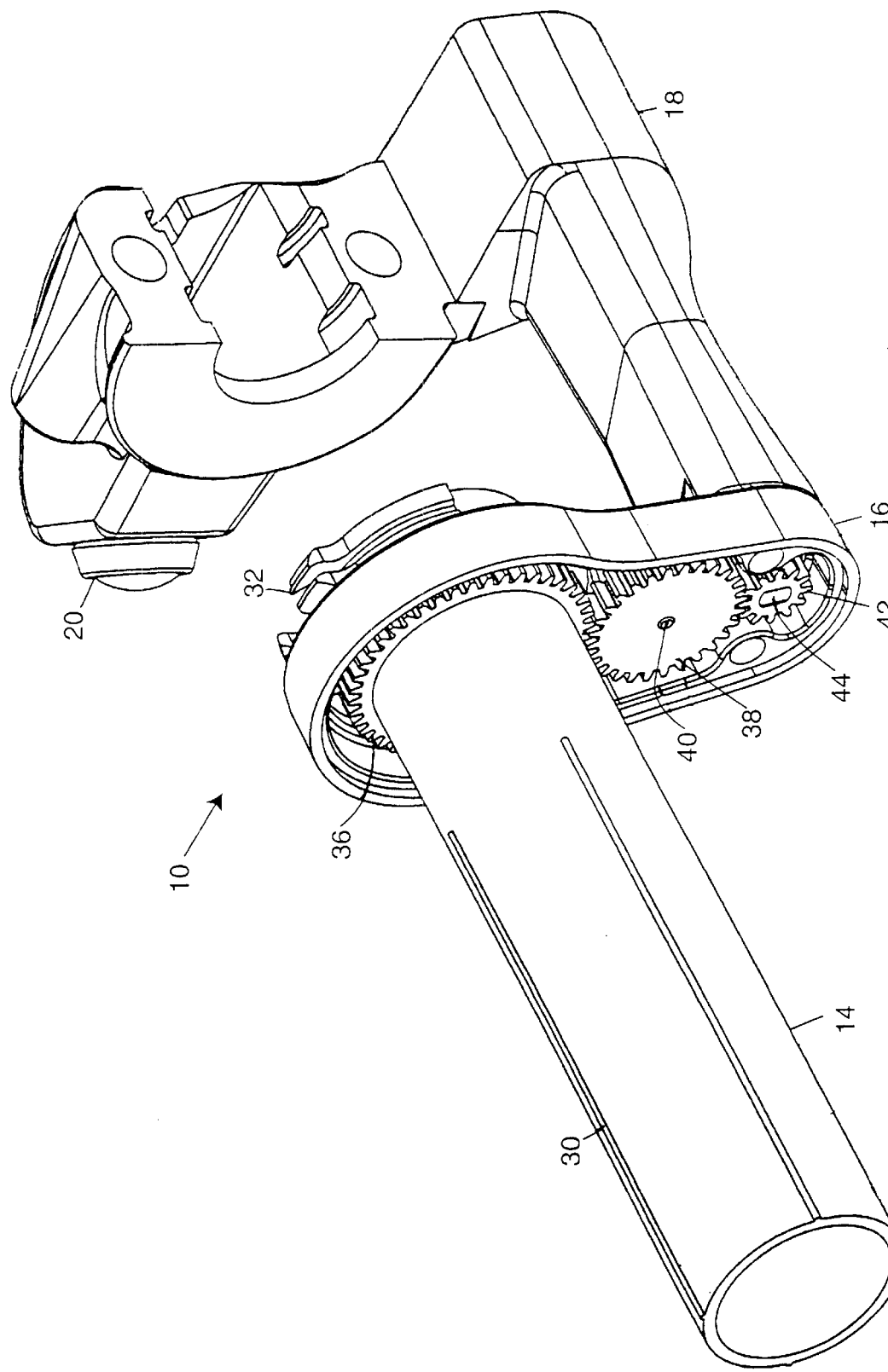
FIG. 3 is a back perspective view of an exemplary motorcycle cruise control in accordance with the present invention wherein a gear box cover plate has been removed to reveal the interior of a gear box thereof.
Figure 4:
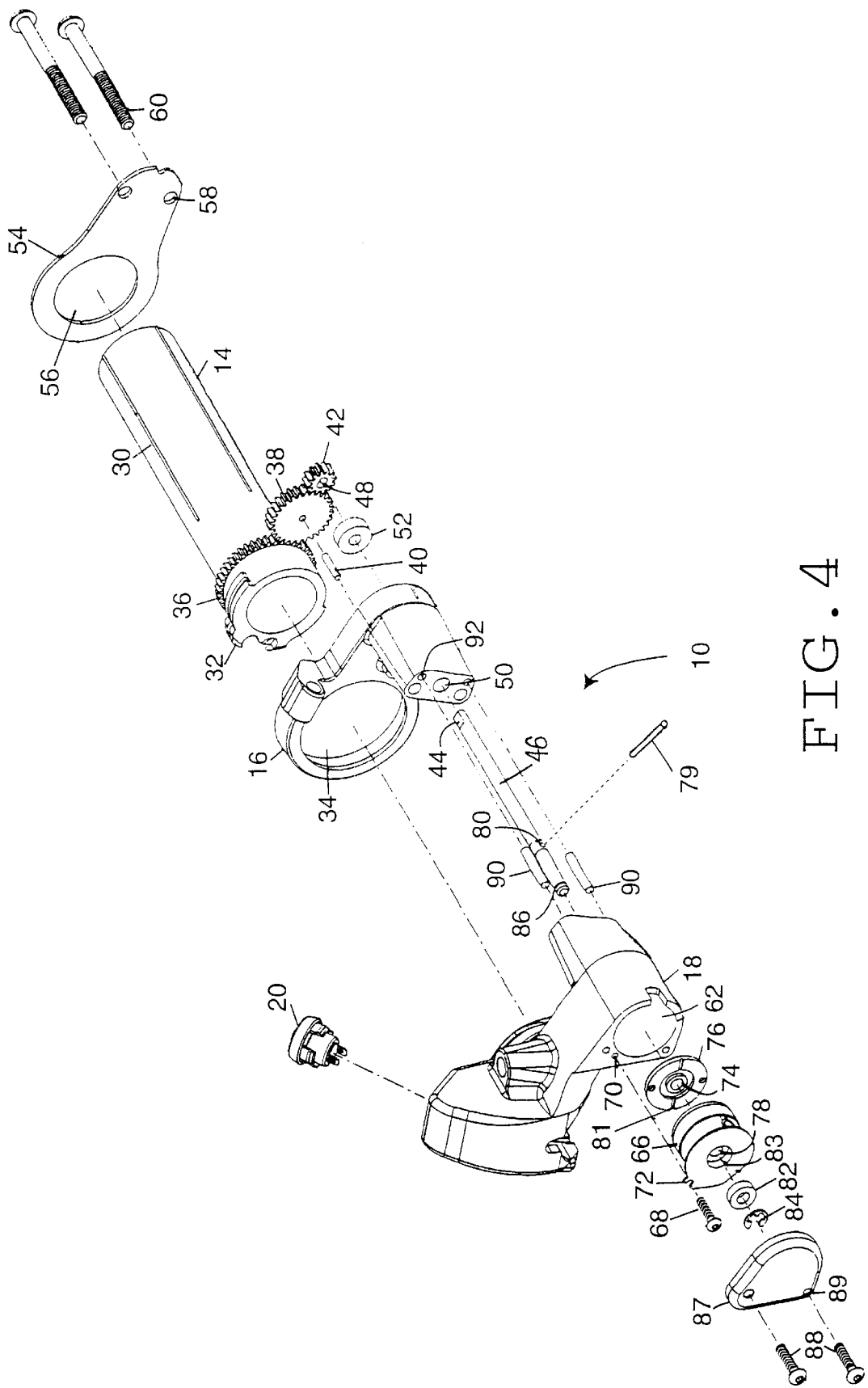
FIG. 4 is an exploded perspective view of the mechanical components of an exemplary motorcycle cruise control in accordance with the present invention.
Figure 5:
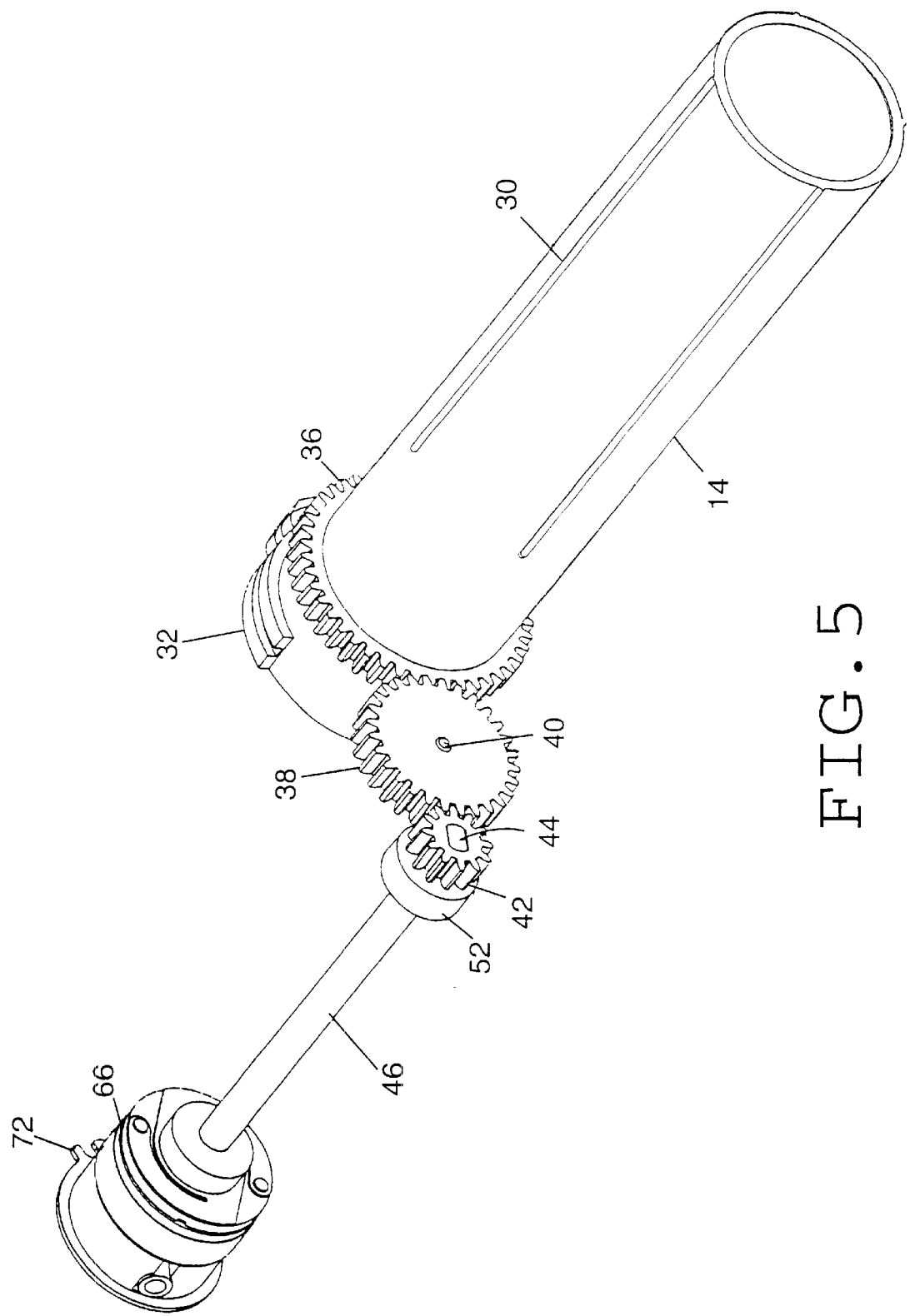
FIG. 5 is a perspective view of selected components of an exemplary motorcycle cruise control in accordance with the present invention, illustrating a mechanical coupling between a throttle-pipe handle and an electromagnetic brake/clutch.

An exemplary motorcycle cruise control 10 in accordance with the present invention is illustrated in FIG. 1, as attached to the handlebar 12 of a motorcycle. Although the exemplary cruise control 10 will be described in detail herein with reference to application thereof to a motorcycle, it should be understood that a cruise control in accordance with the present invention may be applied to any vehicle having a rotatable throttle controller mounted on a vehicle handlebar. A motorcycle cruise control 10 in accordance with the present invention includes a throttle-pipe handle 14 having a throttle pipe grip 15 attached thereto, a gear box housing 16, and an electromagnetic brake/clutch housing 18. As will be discussed in more detail below, the throttle-pipe handle 14 is coupled to spur gears mounted in the gear box housing 16 which, in turn, are coupled to an electromagnetic brake/clutch mounted in the brake/clutch housing 18. The cruise control 10 is activated by actuating a cruise control activation switch 20, which may be implemented as a momentary push button switch, which may be mounted on the electromagnetic brake/clutch housing 18. As will be discussed in more detail below, actuation of the cruise control activation switch 20 causes a control signal to be provided to the electromagnetic brake/clutch which operates to hold the throttle-pipe handle 14 in a desired cruising position.

The exemplary motorcycle cruise control 10 is mounted on the motorcycle handlebar 12 along with other conventional motorcycle components, such as a front brake lever 22 and a switch housing 24. The front brake lever 22 is conventionally mechanically coupled to the front brake of the motorcycle. The motorcycle front brake is activated by pulling the front brake lever 22 toward the throttle-pipe handle 14. Activation of the front brake via the front brake lever 22 also conventionally closes a brake light switch to turn on the motorcycle's brake lights (not shown). The rear brake of a motorcycle is typically operated by a foot pedal, which, when depressed, both activates the rear brake and closes a brake light switch to turn on the motorcycle's brake lights.

The switch housing 24 conventionally houses switches used during start-up and stopping of the motorcycle engine, such as an engine start switch 26 and an engine shut-off switch 28. Other switches, such as a turn indicator light switch (not shown), may also be mounted in the switch housing 24. Preferably, the throttle-pipe handle 14 extends into the switch housing 24 wherein the end of the throttle-pipe handle 14 is coupled, in a conventional manner, to an apparatus whereby rotary motion of the throttle-pipe handle 14 is converted into a linear motion to move throttle cables connected from the switch housing 24 to the throttle linkage of the motorcycle's carburetor. Thus, the motorcycle's engine speed is controlled by rotating the throttle-pipe handle 14 about the centerline of the handlebar 12. Preferably, and conventionally, a return spring (not shown) is connected to the throttle to bias the throttle-pipe handle 14 to the closed or idle position. Therefore, the throttle-pipe handle 14 will automatically return to the idle position unless held in another position either by an operator or by a motorcycle cruise control in accordance with the present invention.

The motorcycle cruise control 10 may be secured to the handlebar 12 by attaching the cruise control 10 to the handlebar 12 and the switch housing 24 in a conventional manner. For example, the gearbox housing 16 and electromagnetic brake/clutch housing 18 may be shaped to fit around the handlebar 12 on opposite ends of the switch housing 24, and may be attached thereto using fasteners, such as screws. The gearbox housing and electromagnetic brake/clutch housing 18 may be made, for example, of die cast aluminum, or some other material.

The exemplary motorcycle cruise control 10 in accordance with the present invention will now be described in more detail with reference to FIGS. 2–5, which illustrate the motorcycle cruise control 10, and various mechanical components thereof. Like reference numerals are used to refer to like components of the cruise control 10 throughout FIGS. 2–5.

The throttle-pipe handle 14 is generally tubular in shape. The throttle pipe handle 14 may be made of a material such as glass-filled nylon plastic, by injection molding or another conventional process. Ridges 30, or another similar structure, may be formed along the length of the throttle-pipe handle 14. The ridges 30 prevent the throttle pipe handle 14 from rotating within the throttle pipe grip 15 (FIG. 1) which is attached thereto. The throttle pipe grip 15 is preferably made of a non-slip material. The throttle-pipe handle 14 is sized such that the interior circumference of the throttle-pipe handle 14 is slightly larger than the outer circumference of the motorcycle handlebar 12. Thus, the cruise control 10 may be mounted to the motorcycle handlebar 12 by inserting the end of the handlebar 12 into the throttle-pipe handle 14. A cam structure 32 may be formed at one end of the throttle-pipe handle 14. The cam structure 32, which may be conventional in design, is provided to couple the throttle-pipe handle 14 to one or more throttle cables (not shown) such that rotary motion of the throttle-pipe handle 14 is converted into a linear motion of the throttle cables. As discussed previously, the throttle cables are, in turn, connected to the throttle linkage of the motorcycle's carburetor. Thus, rotation of the throttle-pipe handle 14 controls the motorcycle's engine speed. The cam structure 32 is preferably positioned on the throttle-pipe handle 14 such that, when the cruise control 10 of the present invention is mounted on the handlebar 12, the cam structure 32 extends into the switch housing 24 (FIG. 1) wherein the throttle cables are connected to the cam structure 32. Thus, the end of the throttle-pipe handle 14 having the cam structure 32 formed thereon preferably extends through a large aperture 34 in the gear box housing 16. The cam structure 32 may be integrally formed as part of the throttle-pipe handle 14, or formed as a separate component which is fixedly attached to the throttle pipe 14.

In accordance with the present invention, a throttle pipe spur gear 36 is formed around the circumference of the throttle-pipe handle 14 at an end thereof near the cam structure 32. The throttle pipe spur gear 36 is preferably made of a wear resistant material, such as nylon 6/6 plastic. The throttle pipe spur gear 36 may be integrally formed as part of the throttle-pipe handle 14. Alternatively, the throttle pipe spur gear 36 may be formed as a separate component which is permanently affixed around the outer circumference of the throttle-pipe handle 14. The throttle pipe spur gear 36 is positioned on the throttle-pipe handle 14 such that the spur gear 36 is positioned within the gear box housing 16 when the cruise control 10 is mounted on a motorcycle handlebar 12 with the cam structure 32 extending through the aperture 34 in the gear box housing 16.

An intermediate spur gear 38 is preferably mounted within the gear box housing 16. The intermediate spur gear 38 is mounted within the gear box housing 16 such that the intermediate spur gear 38 is meshed with the throttle pipe spur gear 36 on the throttle-pipe handle 14. The intermediate spur gear 38 may be mounted in the gear box housing 16 so as to rotate freely about a dowel pin 40 (e.g., a 0.0935 inch diameter by 0.5 inch long dowel pin made, e.g., of steel), which is securely and fixedly mounted in a wall of the gear box housing 16. Rotation of the throttle pipe handle 14 thus causes rotation of the throttle pipe spur gear 36 and the intermediate spur gear 38. The intermediate spur gear may preferably be made of the same wear resistant material as the throttle pipe spur gear 36, e.g., nylon 6/6 plastic.

A cruise control spur gear 42 is also positioned within the gear box housing 16. The cruise control spur gear 42 is positioned within the gearbox housing 16 such that the cruise control spur gear 42 is meshed with the intermediate spur gear 38. Thus, rotation of the intermediate spur gear 38 causes rotation of the cruise control spur gear 42. The cruise control spur gear 42 is mounted to the end 44 of a cruise control shaft 46. The end 44 of the shaft 46 is shaped to fit in a corresponding aperture 48 formed along the axis of the cruise control spur gear 42. The shape of the end 44 of the shaft 46 and the aperture 48 in the cruise control spur gear 42 are such that, when the cruise control spur gear 42 is mounted on the end 44 of the shaft 46, the cruise control spur gear 42 may only be rotated if the shaft 46 is also rotated. Thus, if rotation of the shaft 46 is prevented, rotation of the cruise control spur gear 42 is also prevented. Since the cruise control spur gear 42 is coupled to the throttle pipe spur gear 36 on the throttle-pipe handle 14, via the intermediate spur gear 38, rotation of the throttle-pipe handle 14 will result in rotation of the cruise control shaft 46. Similarly, if rotation of the cruise control shaft 46 is prevented, rotation of the throttle-pipe handle 14 is also prevented.

The three spur gears 36, 38 and 42 are all preferably made of a highly wear resistant material, such as nylon 6/6 or glass-filled acetal. Preferably, all three spur gears 36, 38 and 42 have the same pitch and pressure angle characteristics, e.g., 32 pitch, 14½ pressure angle. Although the three spur gears 36, 38 and 42 may be of any size, the throttle pipe spur gear 36 is preferably larger in diameter than the intermediate spur gear 38 which, in turn, is preferably larger in diameter than the cruise control spur gear 42. Thus, for example, the throttle pipe spur gear 36 may be 1.440 inches in diameter, the intermediate spur year 0.940 inches in diameter, and the cruise control spur gear 0.440 inches in diameter. By employing spur gears 36, 38 and 42 having decreasing diameters, a gear ratio is achieved which reduces the potential for backlash in the throttle-pipe handle 14 when the cruise control shaft 46 is locked into position when the motorcycle cruise control 10 is activated.

It should also be noted that the intermediate spur gear 38 may be eliminated. Thus, the throttle pipe spur gear 36, mounted on the throttle-pipe handle 14, may be coupled directly to the cruise control spur gear 42, which is attached to the cruise control shaft 46. However, the three spur gear configuration illustrated in the drawings is preferred.

The cruise control shaft 46 preferably extends from the gear box housing 16, wherein it is connected to the cruise control spur gear 42, through an aperture 50 therein. A greased bearing 52 (e.g., a 0.500 inch outer diameter by 0.187 inch inner diameter greased bearing) is preferably mounted in the gear box housing 16 co-axial with the aperture 50. The cruise control shaft 46 is extended through the central aperture of the bearing 52. Thus, the bearing 52 provides rotational support for the cruise control shaft 46 in the gearbox housing 16.

A gear box cover plate 54 may be attached to the gear box housing 16 to enclose the components contained therein. The gear box housing 16 and cover plate 54 thus protect the spur gears 36, 38 and 42 from the outside environment. The gear box cover plate 54 has a large aperture 56 formed therein through which the throttle-pipe handle 14 is positioned when the gear box cover plate 54 is attached to the gear box housing 16. The gear box cover plate 54 preferably also includes one or more fastener holes 58 formed therein. The fastener holes 58 are adapted to receive fasteners, e.g., screws 60, which are passed therethrough for securing the gear box cover plate 54 to the gear box housing 16.

The end of the cruise control shaft 46 extending into the electromagnetic brake/clutch housing 18 is coupled to an electromagnetic brake/clutch device 66 which is mounted in the bore hole 62 formed in the electromagnetic brake/clutch housing 18. The electromagnetic brake/clutch device 66 may be implemented using any device which will prevent rotation of the cruise control shaft 46 when an electrical control signal is provided to the device, and which will otherwise allow free rotation of the shaft 46. For example, a conventional commercially available spring clutch designed for operation off of the motorcycle's 12 volt power supply, or an electric stepper motor, may be used to implement the electromagnetic brake/clutch device 66. An exemplary and preferred electromagnetic brake/clutch device 66 which may be employed is the FB08 made by Inertia Dynamics/Rockwell Automation. This 12 volt electromagnetic brake/clutch has a rating of 2.5–3.5 inch pounds of holding torque. (When the gear ratio provided by the spur gears 36, 38 and 42 is taken into account, 2.5–3.5 inch pounds of holding torque can correspond to up to 9.25–13 inch pounds of holding torque at the throttle-pipe handle 14.) The electromagnetic brake/clutch 66 is preferably securely attached to the electromagnetic brake/clutch housing 18. This may be achieved by the use of a fastener 68, such as a screw which is secured in a fastener hole 70 formed in the electromagnetic brake/clutch housing 18, and which engages a notched tab 72 extending from the electromagnetic brake/clutch 66. The fastener 68 prevents rotation of the electromagnetic brake/clutch 66 in the bore hole 62 formed in the electromagnetic brake/clutch housing 18.

The cruise control shaft 46 may be coupled to the electromagnetic brake/clutch 66 by extending the shaft 46 through a central aperture 74 in a brake/clutch friction plate 76 portion of the electromagnetic brake/clutch 66 and through a central aperture 78 of the electromagnetic brake/clutch 66 itself. The shaft 46 is securely attached to the brake/clutch friction plate 76 by, for example, pressing the friction plate 76 on the shaft 46 and extending a pin 79 (e.g., a 0.093 inch diameter roll pin) through a hole 80 through the shaft 46 which is positioned on the shaft 46 such that an extending portion of the pin 79 is engaged in a channel 81 formed on the friction plate 76. When the electromagnetic brake/clutch 66 is not activated, i.e., when a control signal is not provided thereto, the friction plate 76, and the cruise control shaft 46 attached thereto, is able to rotate freely. Thus, when the electromagnetic brake/clutch 66 is not activated, the throttle-pipe handle 14 may be freely rotated into any position. However, when the electromagnetic brake/clutch 66 is activated, by providing a control signal thereto, the friction plate 76 is engaged by the electromagnetic brake/clutch 66 to prevent rotation thereof. Thus, when the electromagnetic brake/clutch 66 is activated, rotation of the cruise control shaft 46 and, therefore, rotation of the throttle-pipe handle 14, is prevented.

The electromagnetic brake/clutch 66 is preferably selected to provide sufficient torque to the throttle-pipe handle 14 when the electromagnetic brake/clutch 66 is activated to overcome the force of the return spring, which will otherwise return the throttle-pipe handle 14 to the idle position, and to maintain the rotational position of the throttle-pipe handle 14 despite vibrational forces encountered as the motorcycle is operated. However, the amount of torque provided by the electromagnetic brake/clutch preferably does not prevent manual rotation of the throttle-pipe handle 14 by a motorcycle operator. Thus, the electromagnetic brake/clutch 66 employed in a motorcycle cruise control 10 in accordance with the present invention preferably allows manual adjustment of the throttle-pipe handle position, and, therefore, of the engine cruising speed, when the motorcycle cruise control 10 is activated. An electromagnetic brake/clutch 66 which provides, for example, less than approximately 14 inch pounds of torque to the throttle pipe handle 14 via the spur gears 42, 38 and 36 will satisfy this requirement.

A greased bearing 82 (e.g., a 0.1875 inch inner diameter by 0.375 inch outer diameter greased bearing) is preferably mounted in a recess 83 formed coaxial to the central aperture 78 of the electromagnetic brake/clutch 66. The cruise control shaft 46 is extended through a central aperture in the bearing 82 such that the bearing 82 supports the shaft 46 for rotational movement in the electromagnetic brake/clutch 66. An E-clip 84 may be clipped in a groove 86 formed near the end of the cruise control shaft 46 to prevent the shaft 46 from moving in an axial direction.

An electromagnetic brake/clutch cover 87 is preferably attached to the electromagnetic brake/clutch housing 18 to cover and enclose the electromagnetic brake/clutch 66 mounted therein. The electromagnetic brake/clutch cover 87 may be made of a material such as steel, and may be mounted to the electromagnetic brake/clutch housing 18 using fasteners, such as screws 88, which are passed through mounting holes 89 formed in the cover 86.

The gear box housing 16 and the electromagnetic brake/clutch housing 18 may be joined together in a conventional manner. For example, the fasteners 60 may extend through the gear box housing 16 into the electromagnetic brake/clutch housing 18 to both attach the gear box cover plate 54 to the gear box housing 16 and to join the gear box housing 16 to the electromagnetic brake/clutch housing 18. Dowel pins 90 (e.g., 0.125 inch diameter by 0.75 inch long steel dowel pins) may be positioned in alignment holes 92 formed in the gear box housing 16 and corresponding alignment holes (not shown) formed in the electromagnetic brake/clutch housing 18 to thereby align the gear box housing 16 and the electromagnetic brake/clutch housing 18 before the fasteners 60 are used to join the gear box housing 16 to the electromagnetic brake/clutch housing 18. The dowel pins 90 also help prevent rotation of the gear box housing 16 with respect to the electromagnetic brake/clutch housing 18.

In accordance with the present invention, the cruise control 10 is enabled by providing an electrical control signal to the electromagnetic brake/clutch 66 to prevent rotation of the throttle-pipe handle 14 when the cruise control activation switch 20 is actuated. The control signal applied to the electromagnetic brake/clutch 66 is removed, to allow free rotation of the throttle-pipe handle 14, in response to activation of the motorcycle's braking system. An exemplary control circuit for providing a control signal to and removing a control signal from the electromagnetic brake/clutch 66 in the manner described is illustrated in, and will be described with reference to, FIG. 6.

The exemplary control circuit 100 is connected between the motorcycle's DC power supply 102, e.g., a conventional 12-volt DC supply, and ground 104, e.g., the motorcycle's frame. As long as the motorcycle's ignition switch is turned on (and the safety engine shut-off switch is turned to the "on" position), a 12-volt DC signal is provided to the circuit 100 from the supply 102. The electromagnetic brake/clutch 66 is connected in series with the cruise control activation switch 20 and a normally closed relay 106 between the DC power supply 102 and ground 104. As mentioned previously, the cruise control activation switch 20 may preferably be implemented as a momentary push button switch. A normally opened relay 108 is connected in parallel with the cruise control activation switch 20. A control coil 110 for the normally open relay 108 is connected in series with the cruise control activation switch 20 between the DC power supply 102 and ground 104, e.g., in parallel with the electromagnetic brake/clutch 66. A cruise control active indicator light 112 is preferably also connected in series with the cruise control activation switch 20 between the DC power supply 102 and ground 104, e.g., in parallel with the electromagnetic brake/clutch 66. The cruise control active light 112 may be implemented in a conventional manner, e.g., using a lamp or light emitting diode. The cruise control active light 112 may preferably be incorporated in the cruise control activation switch 20 itself, i.e., the cruise control active switch 20 may be implemented as a lightable switch. As will be discussed, the cruise control active light 112 is preferably illuminated when the cruise control 10 is activated, i.e., when a control signal is provided to the electromagnetic brake/clutch 66 to inhibit movement of the throttle-pipe handle 14.

Motorcycles and other vehicles conventionally include a brake light system. The brake light system typically includes a brake light activation switch 114 connected in series with a brake light 116 between the motorcycle's DC power supply 102 and ground 104. The brake light activation switch 114 is closed in response to activation of the motorcycle braking system 118, such as by activation of a hand brake lever 22 or a foot brake pedal. When the brake light switch 114 is closed, in response to activation of the braking system 118, current is allowed to flow from the power supply 102 through the brake light 116 to illuminate the brake light 116. In accordance with the present invention, a control coil 120 for the normally closed relay 106 is also connected in series with the brake light activation switch 114 between the power supply 102 and ground 104.

The control circuit 100 illustrated in FIG. 6 operates as follows. During normal operation of the motorcycle, before the cruise control 10 is activated, no current is flowing through the control circuit 100 since both the cruise control activation switch 20 and the brake light activation switch 114 are opened. When the cruise control activation switch 20 is actuated, a signal is provided through the cruise control activation switch 20 and the normally closed relay 106 to the electromagnetic brake/clutch 66, thereby activating the electromagnetic brake/clutch 66 to prevent rotation of the throttle-pipe handle 14 in the manner described above. Actuation of the cruise control activation switch 20 also causes a signal to be provided to the cruise control active light 112, to thereby turn the light 112 on. Furthermore, when the cruise control activation switch 20 is activated a current is provided through the normally open relay control coil 110. The current flowing through the control coil 110 causes normally open relay 108 to close. When the cruise control activation switch 20 is released, a control signal continues to be provided to the electromagnetic brake/clutch 66, the cruise control active light 112, and the control coil 110, through the normally open relay 108 (which is now closed) and the normally closed relay 106. The electromagnetic brake/clutch 66 will thus remain activated, to maintain the throttle-pipe handle 14 in a desired position, until the cruise control 10 is deactivated.

In accordance with the present invention, the cruise control 10 is deactivated automatically upon activation of the motorcycle's braking system. Upon activation of the braking system 118, the brake light activation switch 114 is closed. When the brake light activation switch 114 is closed, a signal is provided through the switch 114 to the brake light 116, to turn it on. Closing the brake light switch 114 also causes a current to flow through the normally closed relay control coil 120. The current flowing through the control coil 120 causes normally closed relay 106 to open. When relay 106 is opened, the connection between the power source 102 and the electromagnetic brake/clutch 66, the cruise control active light 112, and the normally open relay control coil 110 is interrupted. Thus, in response to activation the braking system brake 118, the control signal is removed from the electromagnetic brake/clutch 66, thereby allowing free rotation of the throttle-pipe handle 14, the cruise control active light 112 is turned off, and the normally open relay 108 is opened. When the braking system 118 is released, the brake light activation switch 114 is opened, causing the current through the control coil 120 to disappear, and normally closed relay 106 to return to its normally closed position. However, since the normally open relay 108 was opened in response to activation of the braking system 118, no control signal will be provided to the electromagnetic brake/clutch 66 until the cruise control 10 is activated once again by actuating the cruise control activation switch 20.

A motorcycle cruise control 10 in accordance with the present invention may thus be activated easily, by activating a cruise control activation switch 20, and easily and automatically deactivated, by activating the motorcycle braking system 118 connected to a brake light 116. It should also be apparent that the cruise control 10 is automatically deactivated, i.e., the control signal is removed from the electromagnetic brake/clutch 66, whenever the source of power 102 provided to the control circuit 100 is interrupted. This occurs whenever the motorcycle ignition switch is turned to the "off" position or the safety engine shut-off switch is turned to the "off" position.

Figure 6:
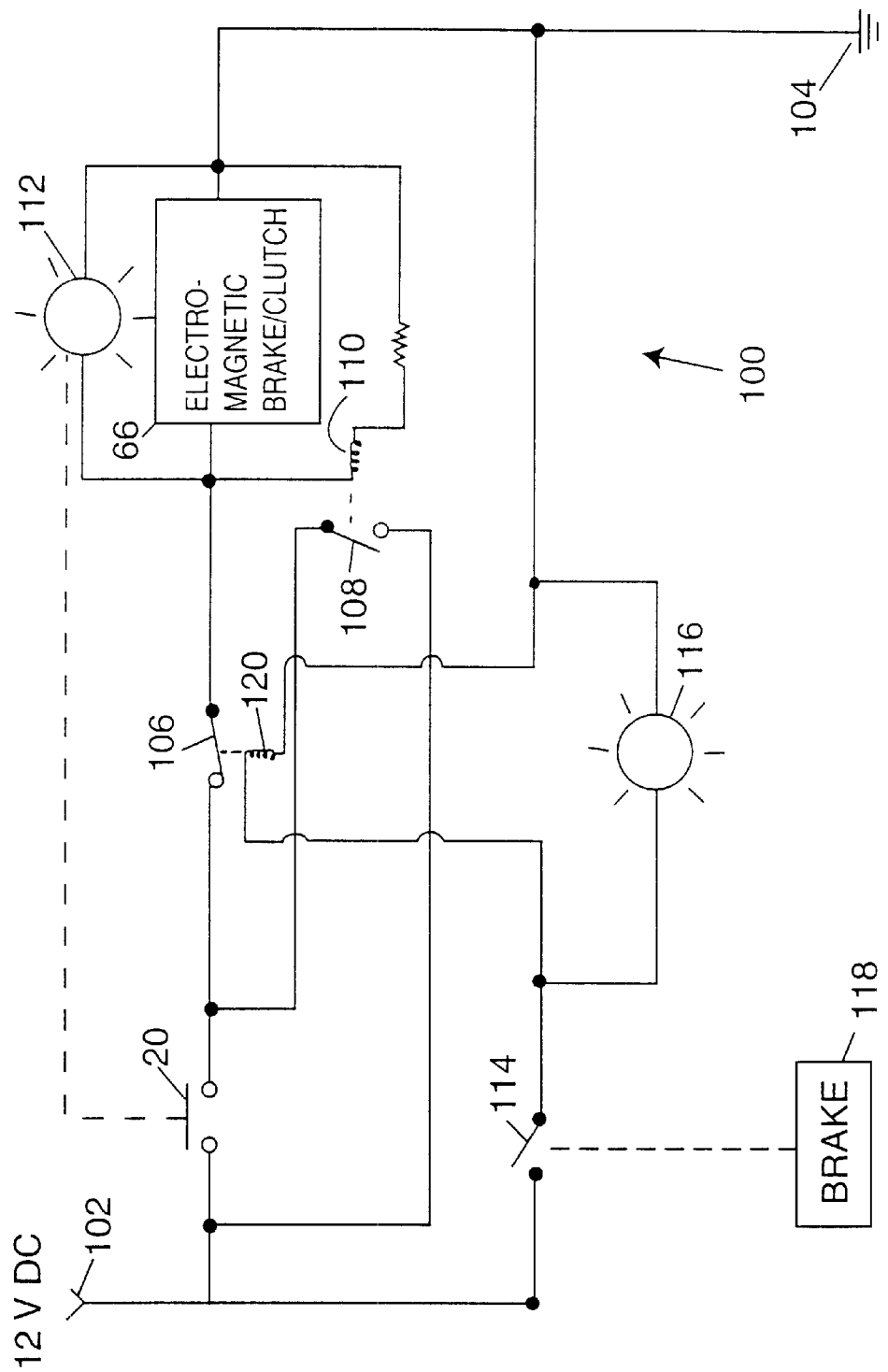
FIG. 6 is a schematic circuit diagram of an exemplary circuit for controlling the electromagnetic brake/clutch of a motorcycle cruise control in accordance with the present invention.

It should be understood that the control circuit 100 illustrated in FIG. 6 is exemplary only, and that other control circuits or systems which activate a motorcycle cruise control in accordance with the present invention in response to actuation of a cruise control activation switch, and which deactivate the cruise control in response to activation of the motorcycle braking system, may also be employed. Such a control circuit may be implemented by those skilled in the art using conventional commercially available circuit components.

The control circuit 100 may be positioned in any convenient place on the motorcycle. For example, the control circuit 100 may preferably be contained in a box mounted under the motorcycle seat. In such a case, the control circuit 100 may be electrically connected to the cruise control activation switch 20, the electromagnetic brake/clutch 66, and the motorcycle brake light system using a conventional wire harness.

A motorcycle cruise control 10 in accordance with the present invention may be operated as follows. The motorcycle is started and the motorcycle engine is brought to a desired cruising speed by rotating the throttle-pipe handle 14 to a desired position. When the desired cruising speed is reached, the cruise control activation switch 20 is actuated. In response to actuation of the activation switch 20, a control signal is provided to the electromagnetic brake/clutch 66. The electromagnetic brake/clutch 66 is coupled to the throttle-pipe handle 14 via the cruise control shaft 46 and the spur gears 42, 38, and 36, such that, when the control signal is provided to the electromagnetic brake/clutch 66, rotation of the throttle-pipe handle 14 is prevented. Preferably, the torque provided by the brake/clutch 66 to the throttle pipe handle is sufficient to overcome the force of the automatic return spring, while still allowing manual rotation of the throttle-pipe handle 14 when the electromagnetic brake/clutch 66 is activated. When the motorcycle's braking system is activated, the control signal provided to the electromagnetic brake/clutch is removed, thereby deactivating the cruise control 10 to allow free rotation of the throttle-pipe handle 14. The throttle pipe handle 14 will automatically return to the idle position, by action of the return spring, when the cruise control 10 is deactivated, unless the throttle-pipe handle 14 is manually turned to another position.

It should be understood that the present invention is not confined or limited to the particular exemplary embodiments, implementations, and applications herein illustrated and described, but embraces all such modified forms thereof as come within the scope of the following claims. In particular, it should be noted that a cruise control in accordance with the present invention is not limited in application to motorcycles, but may be employed with any vehicle having a throttle controller mounted to a handle bar.

What is claimed is:

1. A cruise control for a vehicle having an engine and a throttle controller mounted to a handlebar, comprising:
   (a) a throttle pipe handle adapted to be coupled to the engine such that a speed of the engine is adjusted by rotation of the throttle pipe handle;
   (b) a throttle pipe spur gear attached to the throttle pipe handle such that rotation of the throttle pipe handle rotates the throttle pipe spur gear;
   (c) a cruise control spur gear coupled to the throttle pipe spur gear such that rotation of the throttle pipe spur gear rotates the cruise control spur gear; and
   (d) an electromagnetic brake/clutch device coupled to the cruise control spur gear.

2. The cruise control of claim 1 wherein the throttle pipe spur gear is an integrally formed part of the throttle pipe handle.

3. The cruise control of claim 1 wherein the cruise control spur gear is coupled to the throttle pipe spur gear by an intermediate spur gear meshed to both the cruise control spur gear and the throttle pipe spur gear such that rotation of the throttle pipe spur gear rotates the intermediate spur gear which in turn rotates the cruise control spur gear.

4. The cruise control of claim 3 wherein a diameter of the throttle pipe spur gear is larger than a diameter of the intermediate spur gear and wherein the diameter of the intermediate spur gear is larger than a diameter of the cruise control spur gear.

5. The cruise control of claim 1 wherein the electromagnetic brake/clutch device is an electromagnetic device selected from the group of electromagnetic devices consisting of an electromagnetic brake/clutch, an electromagnetic spring clutch, and an electric stepper motor.

6. The cruise control of claim 1 wherein the electromagnetic brake/clutch device is coupled to the cruise control spur gear by a cruise control shaft.

7. The cruise control of claim 1 wherein the throttle pipe spur gear and the cruise control spur gear are enclosed in a gear box housing.

8. The cruise control of claim 1 wherein the electromagnetic brake/clutch device is enclosed in an electromagnetic brake/clutch housing.

9. A cruise control for a vehicle having an engine and a throttle controller mounted to a handlebar, comprising:
   (a) a throttle pipe handle adapted to be coupled to the engine such that a speed of the engine is adjusted by rotation of the throttle pipe handle;
   (b) a throttle pipe spur gear attached to the throttle pipe handle such that rotation of the throttle pipe handle rotates the throttle pipe spur gear;
   (c) a cruise control spur gear coupled to the throttle pipe spur gear such that rotation of the throttle pipe spur gear rotates the cruise control spur gear; and
   (d) an electric motor coupled to the cruise control spur gear.

10. The cruise control of claim 9 wherein the throttle pipe spur gear is an integrally formed part of the throttle pipe handle.

11. The cruise control of claim 9 wherein the cruise control spur gear is coupled to the throttle pipe spur gear by an intermediate spur gear meshed to both the cruise control spur gear and the throttle pipe spur gear such that rotation of the throttle pipe spur gear rotates the intermediate spur gear which in turn rotates the cruise control spur gear.

12. The cruise control of claim 11 wherein a diameter of the throttle pipe spur gear is larger than a diameter of the intermediate spur gear and wherein the diameter of the intermediate spur gear is larger than a diameter of the cruise control spur gear.

13. The cruise control of claim 9 wherein the electric motor is an electric stepper motor.

14. The cruise control of claim 9 wherein the electric motor is coupled to the cruise control spur gear by a cruise control shaft.

15. The cruise control of claim 9 wherein the throttle pipe spur gear and the cruise control spur gear are enclosed in a gear box housing.

* * * * *